Patented Oct. 16, 1928.

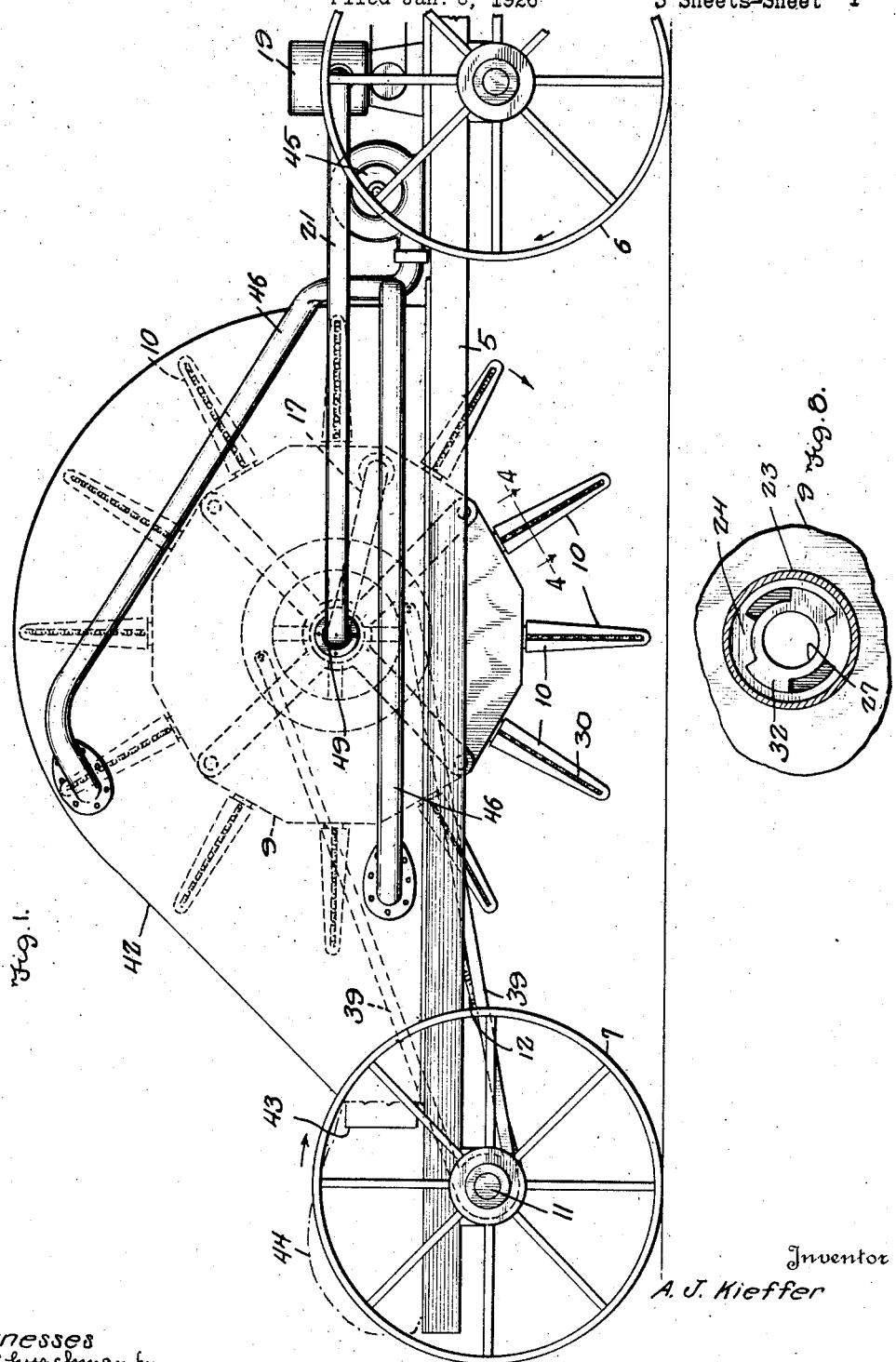

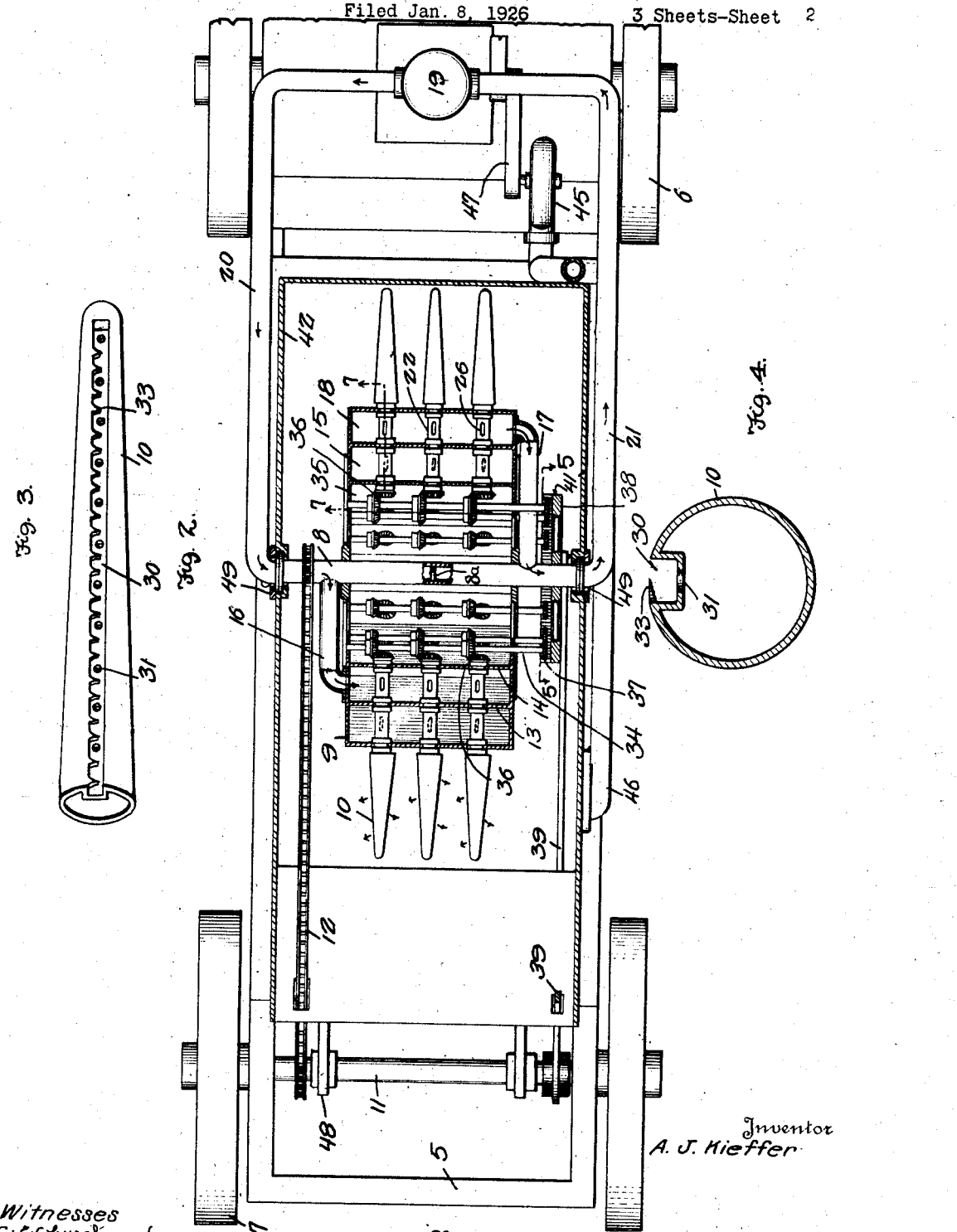

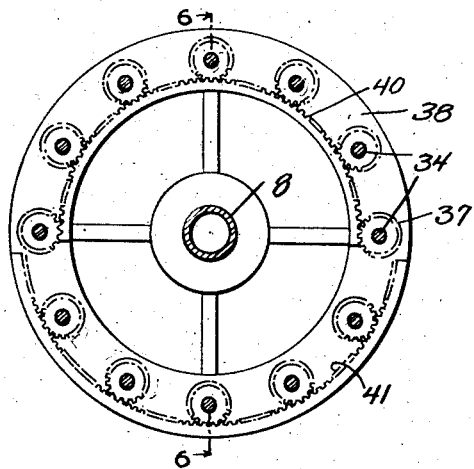
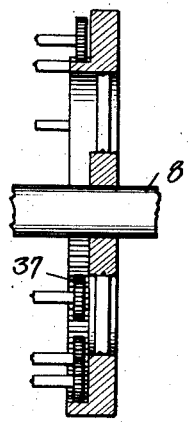
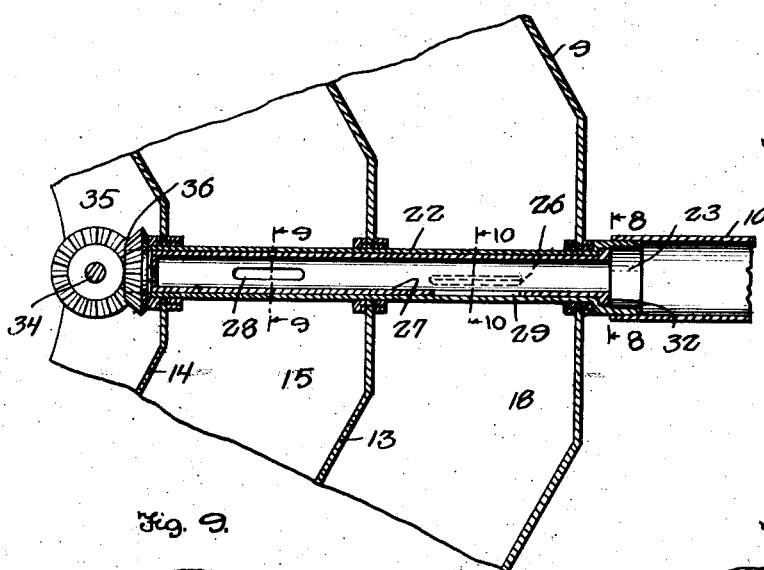
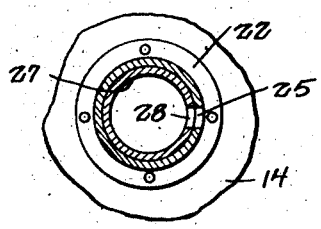
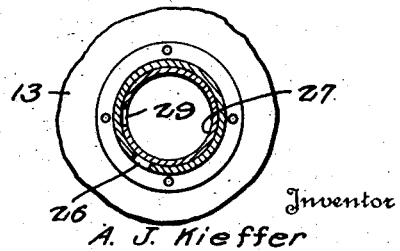

1,687,571

UNITED STATES PATENT OFFICE.

ALLEN J. KIEFFER, OF HOT SPRINGS, SOUTH DAKOTA.

COTTON-PICKING MACHINE.

Application filed January 8, 1926. Serial No. 80,047.

This invention relates to certain new and useful improvements in cotton picking machines, and has particular reference to a machine of this kind adapted to travel along the rows of cotton plants for effecting harvesting of the cotton in the field.

The primary object of the present invention is to provide a cotton picking machine of the above kind which is extremely simple and durable in construction as well as efficient in operation.

Many types of cotton harvesting machines have been devised which solely make use of air suction to cause detachment of the cotton bolls from the plants, but they are more or less defective in operation or objectionable in that they do not effect picking of the cotton in a very positive manner and the cotton is not harvested in as good condition as is desirable. Many other types of cotton harvesting machines have also been devised which embody purely mechanical means to effect detachment of the bolls from the plants and which are open to the same objection.

An object of the present invention, therefore, is to provide a cotton harvesting machine which embodies picking mechanism including cooperatively combined pneumatic and mechanical means for positively effecting picking of the cotton so that the latter is harvested in good condition without undue injury to the plants.

A further object of the invention is to provide an improved cotton picking mechanism embodying hollow fingers or tubes to which the cotton bolls are drawn and held by suction.

A still further object is to provide a picking mechanism wherein practical provision is made for effecting detachment of the cotton from the fingers or tubes and discharge of the same into a suitable collecting receptacle by the use of air pressure.

Still another object of the invention is to provide cotton picking mechanism embodying hollow fingers or tubes constructed and actuated to mechanically detach the bolls from the plants and wherein suction is caused through the fingers when intruded or engaged in the plants for assisting in detaching the bolls from the plants and holding the bolls into engagement with the fingers while conveyed by the latter to a point of discharge.

Other objects will appear as the nature of the invention is better understood, and the case consists in the novel form, combination and arrangement of parts hereinafter more fully described, shown in the accompanying drawings and claimed.

In the drawings, wherein like reference characters indicate corresponding parts throughout the several views;

Figure 1 is a side elevational view of a cotton picking machine constructed in accordance with the present invention;

Figure 2 is a view of the machine shown in Figure 1, partly in horizontal section and partly in plan;

Figure 3 is an enlarged fragmentary perspective view of one of the cotton picking tubes or fingers;

Figure 4 is an enlarged sectional view taken on the plane indicated by line 4—4 of Fig. 1;

Figure 5 is an enlarged detail sectional view taken upon line 5—5 of Figure 2;

Figure 6 is a sectional view taken upon line 6—6 of Figure 5;

Figure 7 is a fragmentary sectional view taken upon line 7—7 of Figure 2 and drawn on a larger scale;

Figure 8 is an enlarged transverse section taken upon line 8—8 of Figure 7; and

Figures 9 and 10 are views similar to Figure 8 taken respectively upon lines 9—9 and 10—10 of Figure 7.

Referring more in detail to the drawings, the present invention includes a carriage adapted to be caused to travel by animal or motor power and preferably consists in a suitable frame 5 provided with front and rear supporting wheels 6 and 7 respectively. Suitably journaled on the frame 5 is a transverse horizontal shaft 8 which is of hollow form and extends from side to side of the frame 5, and fixed upon this shaft between the sides of the frame is a hollow drum 9 provided with a plurality of radial hollow picking fingers or tubes 10 which are preferably arranged in uniformly spaced transverse rows. The rear supporting wheels 7 are preferably secured upon a rotatable rear axle 11 which is operatively connected to the hollow shaft 8 by means of a sprocket gearing 12 or the like, whereby, upon forward travel of the carriage, the picking finger or tube carrying drum 9 is caused to rotate so that the rows of fingers are caused to successively intrude into the plant as the machine is caused to travel ahead with the carriage straddling a row of plants and the wheels of the carriage running between the rows of plants at opposite sides of the particular row of plants from which the cotton is being picked.

The drum 9 is divided into two concentric air tight and non-communicating chambers by means of a pair of spaced concentric partitions 13 and 14, and communicating with the intermediate chamber 15 between the partitions 13 and 14 is a pipe 16 which is disposed at one side of the drum 9 and also communicates with the adjacent end portions of the shaft 8. A further pipe 17 is disposed at the opposite side of the drum 9 and places the other end portion of the shaft 8 in communication with the outer chamber 18 of the drum 9 between the outer wall of the latter and the outermost partition 13. Suitably mounted upon the frame of the carriage and preferably at the forward end of the latter is an air compressor or blower generally indicated at 19 and whose outlet is connected by means of a flexible pipe or conduit 20 with the end of the shaft 8 adjacent the pipe 16. The other end of the shaft 8 which communicates with the pipe 17 is connected by means of a flexible conduit or pipe 21 with the intake of the blower or compressor 19, and the shaft 8 is closed as at 8ª between the pipes 16 and 17 so that when the blower or compressor 19 is placed into operation air under pressure is forced into the chamber 15 while a suction is produced in the chamber 18 as clearly indicated by the arrows in Figure 2.

Suitably journaled in and extending through the partitions 13 and 14 and the outer wall of the drum 9 are a plurality of radially disposed hollow shafts 22, each of which is provided with an enlarged outer end portion 23 upon which is secured the inner end of one of the fingers 10 and which is provided with a pair of spaced diametrically opposed internal arcuate lugs 24 as clearly shown in Figure 8. Each shaft 22 is further provided with a pair of ports preferably consisting in longitudinally elongated slots 25 and 26 which are respectively disposed to open into the chambers 15 and 18. In other words, the slots 25 and 26 are provided in the sides of the shaft 22 so that one is located at the inner side of the partition 13 and the other at the outer side of the latter for respectively placing the shaft 22 in communication with the chamber 15 and the chamber 18.

Rotatably fitted in each of the hollow shafts 22 is a hollow valve cylinder or sleeve valve 27 which is provided with a pair of side ports 28 and 29 adapted to be respectively brought into and out of registry with the ports 25 and 26 when the sleeve valve 27 is given a rotary oscillatory movement. The ports 28 and 29 are in staggered relation so that when the port 28 is brought into registry with the port 25, the port 29 will be out of registry with the port 26 and vice versa.

Each picking finger or tube 10 is provided with a longitudinal channel or groove 30 in one side thereof and extending substantially from end to end of the same, and opening through the side of the finger at the bottom of this groove are a plurality of perforations or openings 31. It is thus apparent that when the ports 25 and 28 are brought into registry as shown in Figures 7 and 9, the compressed air in the chamber 15 may pass into and through the ports 25 and 28 and then through the fingers 10 and the openings or perforations 31 of the latter, while, when the ports 25 and 28 are out of registry and the ports 26 and 29 are registered suction in the chamber 18 causes suction to be produced in the fingers 10 which results in air being drawn into the latter through the perforations 31 thereof. Thus, when the suction is produced the cotton will be held to the sides of the fingers or tubes and when air pressure is forced through the fingers, said cotton is caused to be dislodged and discharged from the fingers.

The outer end of each sleeve valve 27 is provided with a pair of diametrically opposed external lugs 32 of segmental form and disposed between and capable of limited movement between the lugs 24 of the associated shaft 22. This permits rotation of the valve 27 relative to the shaft 22 associated therewith, until the desired ports have been registered, whereupon the lugs 32 will engage the lugs 24 and then cause partial turning of the associated shaft 22 and the finger 10 carried thereby. In order that this turning movement of the fingers or tubes may be utilized for detaching the cotton bolls from the plants assisted by the suction, each finger is provided along one side of its groove 30 with a longitudinal series of spaced prongs or pins 33 which project transversely of the finger toward the other side of the groove.

Means is provided for turning the fingers in one direction, or in a clockwise direction as shown in Figure 4, for causing the prongs 33 to effect detachment of the bolls when the fingers move downwardly and rearwardly to intrude into the plant and immediately succeeding the turning of the valve 27 of said fingers relative to the shaft 22 thereof to effect registry of the ports 26 and 29 for producing suction in the fingers or tubes, whereby the actuation of the fingers for detachment of the bolls from the plants is effected while suction is produced in the fingers so that the suction and mechanical detaching operation are simultaneously effected for cooperating in detaching the cotton from the plants in good condition and for effectively holding the cotton to the fingers to be carried by the latter rearwardly to a point of discharge. This means is also constructed to reversely rotate the sleeve valves 27 so as to bring the ports 26 and 29 out of registry and the ports 25 and 28 into registry when the fingers reach their rearward discharge position so that the suction in such fingers will be destroyed at such times and air under pressure forced through the fingers for effecting detachment of the cotton from the fingers and discharge of the same, as well as return of the fingers to normal position where they will be again ready to be operated or turned for repeating the picking operation. This valve and finger actuating mechanism embodies a plurality of transverse shafts 34 carried by the drum 9 within the innermost compartment 35 of the latter as well as arranged so that one of the same is disposed inwardly of each row of fingers. These shafts 34 are rotatably geared to the inner ends of the sleeve valves 27 by means of beveled gearing generally indicated at 36, and the shafts 34 project outwardly through one side of the drum 9 and have spur pinions 37 fixed upon their projecting ends. A frame or spider 38 is mounted on the shaft 8 outwardly of the projecting ends of the shafts 34 so that the shaft 8 may turn in said spider or frame, and the latter is restrained from rotation by suitable means such as a pair of rods 39 which are connected and pivoted upon the rear axle 11 at their rear ends and which project forwardly and upwardly and have their forward ends secured to the spider or disk 38 at opposite sides of the shaft 8. Rigidly carried by the spider 38 adjacent the upper portion of the latter and at the inner side of the same is an external ring gear segment 40 into engagement with which the pinions 37 will move when disposed above a horizontal plane intersecting the longitudinal axis of the shaft 8, as seen in Figure 5, and also rigid with the lower portion of the spider 38 at the outer side thereof is an internal ring gear segment 41 into engagement with which the pinions 37 will move when below such horizontal plane. It is thus apparent that when the drum 9 is rotated, the fingers are caused to intrude into the plants and by reason of the engagement of certain of the pinions 37 with the internal ring gear segment 41, such intruded fingers will be rotated in a clockwise direction for causing the spurs or prongs 33 to detach the bolls, while at the same time the sleeve valves are turned relative to the finger or tube shafts so as to establish suction in the fingers or tubes to assist in detaching the cotton bolls and maintaining the latter upon the sides of the fingers. Suitably mounted upon the frame 5, connected to the axle 11 as at 48, and disposed to encase the upper portion of the drum and the uppermost fingers thereof is a hood 42 having a discharge end 43 at the rear side of the drum adapted to be placed in communication with the open end of a suitable collecting receptacle 44 preferably composed of material pervious to air. As the fingers rotate with the drum and move rearwardly and upwardly to withdraw from the plants and to move into a discharging position within the hood 42, the certain pinions 37 will engage the external ring gear segment 40 so that the valves of the withdrawn fingers are rotated in a counter-clockwise direction for destroying the suction in the fingers and establishing communication with the compressed air chamber 15 so that air is forced outwardly of these fingers whereby the cotton is detached from the latter and discharged from the hood 42 into the receptacle 44. The fingers are then rotated in a counter-clockwise direction so as to be reset for repeating the picking operation upon continued rotation of the drum. The cotton will be retained in the receptacle 44 while the air will be allowed to readily pass outwardly therethrough due to its pervious nature as is well known in the art.

In order to assist in detachment of the cotton from the fingers or tubes when they reach their withdrawn discharging position, a fan or blower 45 may be mounted upon the frame 5 preferably adjacent the compressor 19, the fan or blower 45 having its outlet placed into communication with the hood 42 at the rear side of the drum 9 and at the rear upper side of the latter by means of flexible pipes or conduits 46. In this way air under pressure is forced into the hood 42 so as to cause the cotton to be blown from the latter rearwardly into the receptacle 44 and at the same time to assist in detachment of the cotton from the fingers or tubes when the latter are at the discharging position within the rear portion of the hood. The principal function of the fan 45 is to cause travel of the cotton from the hood into the receptacle 44, while the air pressure in the fingers is principally employed for detaching the cotton from the latter. Any suitable means may be provided for causing operation of the fan 45, and a belt driving means 47 for this purpose is merely illustrated by way of example.

By providing the fingers or tubes upon a horizontal rotatable drum mounted upon a transverse axis the fingers may pass into and out of the plants without causing undue injury to the latter, and by causing the cotton to be picked at the sides of the fingers substantially throughout their length, a maximum amount of cotton may be harvested in a given amount of time.

From the foregoing description it is believed that the construction and operation as well as the advantages of the present invention will be readily understood and appreciated by those skilled in the art.

What I claim as new is:—

1. In a cotton picker, a carriage, a rotatable drum carried by the carriage, axially rotatable hollow picking fingers supported by and projecting radially from the drum, means for rotating the drum for causing the fingers to intrude into and withdraw from the plants as the carriage travels, means for causing suction through the fingers while they are at intruded position and for causing outward air discharge through them while they are at withdrawn position, and cotton boll engaging and detaching prongs carried by said fingers, and means to rotate the fingers upon rotation of the drum, said drum having a pair of chambers, means for producing suction in one of the chambers and compression of air in the other chamber, and means for causing suction and air discharge through the fingers embodying rotatable sleeve valves for alternately placing the chambers in communication with the fingers.

2. In a cotton picker, a carriage, a rotatable drum carried by the carriage, axially rotatable hollow picking fingers supported by and projecting radially from the drum, means for rotating the drum for causing the fingers to intrude and withdraw from the plants as the carriage travels, means for causing suction through the fingers while they are at intruded position and for causing outward air discharge through them while they are at withdrawn position, and cotton boll engaging and detaching prongs carried by said fingers, and means to rotate the fingers upon rotation of the drum, said drum having a pair of chambers, means for producing suction in one of the chambers and compression of air in the other chamber, and said means for causing suction and air discharge through the fingers embodying rotatable sleeve valves for alternately placing the chambers in communication with the fingers, and the means for causing rotation of the fingers embodying operative connections between the sleeve valves and the fingers.

3. In a cotton picker, a carriage, a rotatable drum carried by the carriage, axially rotatable hollow picker fingers carried by and projecting radially from the drum, means for rotating the drum for causing the fingers to intrude and withdraw from the plants as the carriage travels, means for causing suction through the fingers while they are at intruded position and for causing outward air discharge through them while they are at withdrawn position, and cotton boll engaging and detaching prongs carried by said fingers, and means to rotate the fingers upon rotation of the drum, said drum having a pair of chambers, means for producing suction in one of the chambers and compression of air in the other chamber, and said means for causing suction and air discharge through the fingers embodying rotatable sleeve valves for alternately placing the chambers in communication with the fingers, and the means for causing rotation of the fingers embodying operative connections between the sleeve valves and the fingers, said operation connections permitting limited movement of the sleeve valves relative to the fingers to establish suction or air discharge in the latter prior to rotation of the same.

4. In a cotton picker, a carriage, a hollow shaft revolubly mounted transversely of said carriage, a drum body axially mounted upon said shaft to revolve therewith, means forming a plurality of annular chambers within said drum, a partition within said hollow shaft intermediate the ends thereof to divide the same into two sections, an air force pump, means connecting said pump with said shaft ends for drawing air from one end and forcing air into the other end, an air line leading from one end of said hollow shaft to one of said chambers, an outlet air line leading from the other end of said hollow shaft to another of said chambers, a plurality of hollow picking arms projecting radially from said drum and each having a tubular extension passing into said annular chambers, and valve controlled means for permitting air to be sucked into one of said chambers through said picking fingers during a portion of the revolution of said drum, and other valve controlled means for permitting air to be forced through said fingers from another of said annular chambers upon the fingers being brought to another position through the revolution of the drum, and means to revolve the drum.

In testimony whereof I affix my signature.

ALLEN J. KIEFFER.